Dec. 10, 1935.  S. GUARNASCHELLI  2,023,417
DIE FOR AND METHOD OF MAKING SPIRALLY CORRUGATED TUBING
Filed Dec. 11, 1933
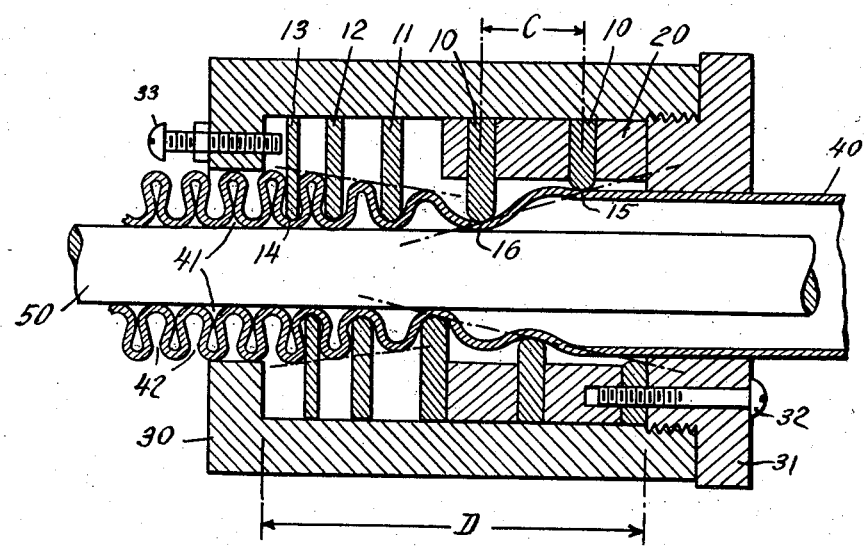
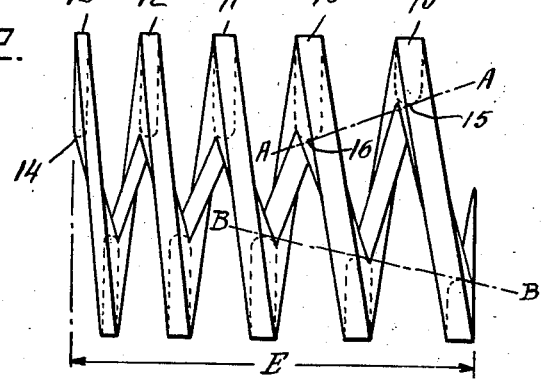
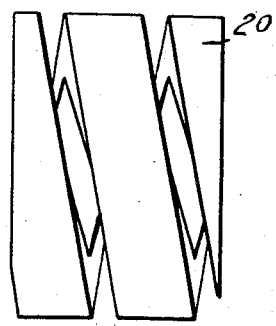
INVENTOR
Stephen Guarnaschelli
BY
Marshall & Hawley
ATTORNEYS

UNITED STATES PATENT OFFICE 2,023,417

DIE FOR AND METHOD OF MAKING SPIRALLY CORRUGATED TUBING

Stephen Guarnaschelli, Brooklyn, N. Y., assignor to Packless Metal Products Corporation, New York, N. Y., a corporation of Delaware Application December 11, 1933, Serial No. 701,738

11 Claims. (Cl. 153—71)

This invention relates to improvements in die for and method of making spirally corrugated tubing.

Its object is to provide a novel method of deforming a seamless tube to corrugate it helically by transverse pressure and then shortening the distance between the corrugations by longitudinal pressure.

Another object is to provide a simple die for accomplishing such result. More particularly, its object is to provide means for producing a flexible seamless tube in one operation, of which the folds which form the inner surface are nearly or quite in contact with one another.

A still further object is to provide a method and an instrumentality for forming spirally corrugated metallic tubing with the least harmful distortion of the molecular structure of the metal.

These and other objects of the invention will appear from the following specification in which I will describe the invention, the novel features of which will be pointed out in appended claims.

Referring to the drawing,

Fig. 1 is a sectional elevation of a die and its housing which is made according to and embodies my invention, together with a piece of seamless tubing illustrating the operation of the device;

Fig. 2 is an elevation of the die shown in Fig. 1 in its condition before its insertion and adjustment in its housing; and Fig. 3 is an elevation of a helical spacer which is used with the die.

The die illustrated is a one piece spring-like helical structure of comparatively flat metal. At its right hand end as shown, its first few convolutions, designated by 10, 10 are of equal thickness and its other convolutions, designated by 11, 12 and 13 gradually decrease in thickness to its end 14. The inner edge of this helix tapers inwardly on the lines A—A and B—B (Fig. 2) from a diameter slightly in excess of that of the uncorrugated tubing 40 to that of the outer surface of the indented part of the corrugations formed. The inclination of the lines A—A and B—B is such that from the point 15 to the point 16, the diameter decreases in the distance C (Fig. 1) which is one complete convolution of the inner surface of the die, from the outside diameter of the tubing 40, to the diameter of the outer surface of the indented corrugations. It may be noted that this convolution between the points 15 and 16 is on the thick part 10 of the die.

The inner surface of the parts 11, 12 and 13 of decreasing thickness is cylindrical and of substantially the same radius as that of the point 16 from the axis.

The spacer 20 is a helical piece, preferably of rectangular cross section. Its width is the same as the distance C less the thickness of the convolutions 10.

In use, the spacer is placed between the convolutions 10 of the die and the two parts thus related are placed within a housing 30 and held in place therein by a screw cap 31. 32 is a screw passing through the cap 31, the first convolution 10 of the die and into the first convolution of the spacer to prevent relative rotation of these parts. The distance D between the inner end of the housing and the inner end of cap 31 (Fig. 1) is less than the over-all length E of the die (Fig. 2). Consequently, when the cap 31 is screwed into place, the convolutions 11, 12 and 13 will be compressed or brought closer together. Because of the varying thickness of these convolutions, this compression will be uneven, being greater at the end of the die. From Fig. 1 it will be seen that the distance between convolutions 13 and 12 is less than that between 12 and 11 and that there is still greater distance between convolutions 11 and 10. The spacer 20 prevents any compression between the convolutions 10, 10.

33 is a screw in the end of housing 30 bearing on the end of the die by means of which the degree of compression may be adjusted.

In use, the tubing 40 is placed over a cylindrical mandrel 50 and the assembled die and housing placed over the end of the tubing. Relative rotation, preferably by turning the die over the tubing, will cause the die to move over the tubing longitudinally. One complete revolution of the die will advance the die so that point 16 will move to the position in which the point 15 is shown in Fig. 1 and will force the tubing inwardly until its inner surface abuts the mandrel 50. Thus, the complete transverse deformation of the tubing is accomplished by one revolution of the die.

This operation may be continued with a die having the convolutions 11, 12 and 13 omitted, to produce a tube with uniform but comparatively widely spaced corrugations. This can be compressed by other means such as have been used heretofore. According to my invention, however, I subject the corrugated tube to longitudinal pressure as the convolutions 11, 12 and 13 pass over it, thereby closing adjacent parts of the corrugations together a desired amount dependent upon the setting of the adjusting screw 33. As shown in Fig. 1 the corrugations have been closed together until they abut at 41 near the inside of the tube. A space 42, equal to the width of the last convolution 13 of the die, is left between adjacent parts of the corrugations near the outside of the tube. This provides the desired flexibility.

I have described the transverse deformation as being accomplished in one revolution of the die as I believe this results in a minimum stretching of the metal and less molecular deformation. I do not limit myself in this particular, however, as I believe the essential novelty of this part of my method is in making the transverse deformation with a die having a uniform pitch, maintained in the particular example described for illustrative purposes by the spacer 20.

I have described the longitudinal compression of the corrugated tube as being accomplished in a plurality of revolutions. I do not limit myself in this particular as I believe that the novel feature of this part of my invention resides in the fact that the longitudinal compression is obtained in a part of the die which effects no transverse deformation. In fact I intend no limitations other than those imposed by the following claims.

What I claim is:

1. The herein described method of making corrugated tubing which comprises deforming a cylindrical tube transversely by forcing the wall thereof inwardly to the full depth of the finished corrugations within a longitudinal distance substantially equal to the pitch of the corrugations thus formed, and by the same instrumentality applying longitudinal pressure to the folds thus formed to reduce the pitch of the corrugations.

2. The herein described method of making corrugated tubing which comprises deforming a cylindrical tube transvesely by forcing the wall thereof inwardly to the full depth of the finished corrugations within a longitudinal distance substantially equal to the pitch of the corrugations thus formed, and by the same instrumentality applying longitudinal pressure to the folds thus formed to reduce the pitch of the corrugations consecutively.

3. The herein described method of making corrugated tubing which comprises deforming a cylindrical tube transversely to the full depth of the finished corrugations by rotating a rigid member around and along the tube from a position on the outside of the tube to a position at the bottom of the groove thus formed while said member is making substantially one revolution and is advancing along the tube a distance substantially equal to the pitch of the groove, and applying longitudinal pressure by the same member to the folds thus formed to reduce the pitch of the groove.

4. The herein described method of making corrugated tubing wihch comprises deforming a cylindrical tube transversely to the full depth of the finished corrugations by rotating a rigid member around and along the tube from a position on the outside of the tube to a position at the bottom of the groove thus formed while said member is making substantially one revolution and is advancing along the tube a distance substantially equal to the pitch of the groove, and applying longitudinal pressure by the same member to the folds thus formed to consecutively reduce the pitch of the groove during successive turns of the member around the tube.

5. A die for making corrugated tubing which comprises an integral helical member having equally spaced convolutions of decreasing inner diameters to transversely deform a tube and form corrugations therein, and unequally spaced convolutions of like inner diameters to gradually reduce the pitch of said corrugations.

6. A die for making corrugated tubing which comprises a longitudinally compressible helical member, the convolutions of which near one of its ends having decreasing inner diameters and its other convolutions having substantially equal inner diameters, means for maintaining the convolutions of decreasing inner diameters equally spaced, and means for compressing the helical member to decrease the distances between its other convolutions.

7. A die for making corrugated tubing which comprises a longitudinally compressible helical member, the convolutions of which near one of its ends having decreasing inner diameters and its other convolutions having substantially equal inner diameters, means for maintaining the convolutions of decreasing inner diameters equally spaced, and adjustable means for compressing the helical member to decrease the distances between its other convolutions.

8. A die for making corrugated tubing which comprises a longitudinally compressible helical member, the convolutions of which near one of its ends are of like thickness and having decreasing inner diameters and its other convolutions decreasing in thickness and having substantially equal inner diameters, means for maintaining the convolutions of decreasing inner diameters equally spaced, and means for compressing the helical member to decrease the distances between its other convolutions.

9. A die for making corrugated tubing which comprises a longitudinally compressible helical member, the convolutions of which near one of its ends are of like thickness and have descreasing inner diameters and its other convolutions decreasing in thickness and having substantially equal inner diameters, means for maintaining the convolutions of decreasing inner diameters equally spaced, and adjustable means for compressing the helical member to decrease the distances between its other convolutions.

10. A die for making corrugated tubing which comprises a longitudinally compressible helical member, the convolutions of which near one of its ends having decreasing inner diameters and its other convolutions having substantially equal inner diameters, a spacer between the convolutions of decreasing inner diameters, and a housing for holding the spiral member arranged to compress said member to decrease the distances between its other convolutions.

11. A die for making corrugated tubing which comprises a longitudinally compressible helical member, the convolutions of which near one of its ends having decreasing inner diameters and its other convolutions having substantially equal inner diameters, a spacer between the convolutions of decreasing inner diameters, and a housing for holding the spiral member provided with adjustable means for compressing said member to decrease the distances between its other convolutions.

STEPHEN GUARNASCHELLI.